United States Patent [19]
Engelbart

[11] Patent Number: 5,158,037
[45] Date of Patent: Oct. 27, 1992

[54] DEVICE FOR RAISING AQUATIC ANIMALS

[76] Inventor: Wilke Engelbart, Karlshoferstr.1, D-2910 Howiek, Fed. Rep. of Germany

[21] Appl. No.: 566,370
[22] PCT Filed: Feb. 21, 1989
[86] PCT No.: PCT/DE89/00106
   § 371 Date: Oct. 26, 1990
   § 102(e) Date: Oct. 26, 1990
[87] PCT Pub. No.: WO89/07885
   PCT Pub. Date: Sep. 8, 1989

[30] Foreign Application Priority Data

Feb. 24, 1988 [DE] Fed. Rep. of Germany ....... 3805607

[51] Int. Cl.⁵ ............................................. A01K 61/00
[52] U.S. Cl. ......................................................... 119/3
[58] Field of Search ................................... 119/2, 3, 5

[56] References Cited

U.S. PATENT DOCUMENTS

| | | |
|---|---|---|
| 1,681,890 | 8/1928 | Washburn . |
| 4,182,268 | 1/1980 | Berger ..................... 119/3 |
| 4,221,187 | 9/1980 | Casey ....................... 119/3 |
| 4,368,691 | 1/1983 | Brune ....................... 119/2 |
| 4,903,636 | 2/1990 | Kroeker .................... 119/3 |
| 4,951,606 | 8/1990 | Hartung .................... 119/3 |
| 4,972,801 | 11/1990 | Hunt ........................ 119/3 |

FOREIGN PATENT DOCUMENTS

| | | |
|---|---|---|
| 101706 | 5/1897 | Fed. Rep. of Germany . |
| 1782335 | 1/1972 | Fed. Rep. of Germany . |
| 106540 | 6/1974 | Fed. Rep. of Germany . |
| 2638489A1 | 3/1978 | Fed. Rep. of Germany . |
| 2809493A1 | 9/1979 | Fed. Rep. of Germany . |
| 3039029A1 | 5/1982 | Fed. Rep. of Germany . |
| 2508749C2 | 11/1982 | Fed. Rep. of Germany . |
| 3331719A1 | 3/1985 | Fed. Rep. of Germany . |
| 3443057A1 | 6/1985 | Fed. Rep. of Germany . |
| 3434669A1 | 4/1986 | Fed. Rep. of Germany . |
| 383008B | 5/1987 | Fed. Rep. of Germany . |
| WO 87/07475 | 12/1987 | Fed. Rep. of Germany . |
| WO87/07590 | 12/1987 | Fed. Rep. of Germany . |
| 3619757A1 | 12/1987 | Fed. Rep. of Germany . |
| 2367705 | 5/1978 | France . |
| 1106527 | 3/1968 | United Kingdom . |
| 1310136 | 3/1973 | United Kingdom . |
| 2018551A | 10/1979 | United Kingdom . |

Primary Examiner—Gene Mancene
Assistant Examiner—Thomas Price
Attorney, Agent, or Firm—Fish & Richardson

[57] ABSTRACT

Device for aquaculture, especially for raising fish and/or plankton, with addition of oxygen-containing gas and nutrients, with aerating devices 21 to 24 arranged in pools or ponds 1 of a suitable shape and a gas throughput adjusted so that a bubble curtain is produced without major turbulence in the water of pond 1.

30 Claims, 5 Drawing Sheets

DEVICE FOR RAISING AQUATIC ANIMALS

BACKGROUND OF THE INVENTION

The invention relates to a device of the type described in the preamble of claim 1.

The bibliographic reference "DLG-Mitteilungen 7/1980, pages 393 to 398" describes technical methods for raising fish, according to which fish-raising facilities are divided into two groups, namely through facilities and recycled facilities. In contrast to through facilities, in which the water is used only once and is then drained out of the fish-raising facility, in recycled facilities the used water is recycled and then fed back into the fish pond.

Recycling of the water in recycled type facilities is performed in a bypass, either in an activated sludge pond with or without dip elements or in a drip element facility, like that known from biological wastewater purification. An important feature of this method of recycling the water is the removal of feces and sludge from the water, which is clarified before being returned to the fish pond. Settling tanks and/or screens are used for this purpose.

German OS 36 19 757 teaches a fish pond for intensive fish feeding and a method of operating a fish pond of this kind, whose essential feature consists in the simultaneous aeration and biological treatment of the water in a fish pond using the adhesive activated sludge method, whereby packing like that known from cooling tower technology is placed in a shaft located in the middle of the fish pond above aerating equipment, said packing serving as large-area inserts to absorb so-called biological turf, which is biologically processed according to the airlift pump principle by the water flowing through the shaft.

Without intermediate clarification, the water thus treated is returned through barrier screens to the fish part of the pond, while the feces and surplus sludge remain in the water and are kept suspended in the non-aerated fish part by the resultant flows and by the fish themselves. Enrichment of suspended matter in the fish pond is avoided by guiding water in a bypass through a settling pond where the materials that settle out are enriched and drawn off and the clarified water is returned to the fish pond.

The advantage of this known method over the method used in the through and recycled facilities lies in a much more frequent throughput of the fish pond water through the biological processing part and in a considerably reduced area requirement for the settling pond and/or a sludge filter.

SUMMARY OF THE INVENTION

The goal of the invention, in a method of the species recited at the outset, is to optimize the living conditions for intensive raising of fish and other aquatic animals in such a way that, depending on the animal species in question, a maximum growth rate is obtained by utilizing biological boundary conditions.

This goal is achieved by the characterizing features of claim 1.

The solution according to the invention creates the preconditions for optimum raising of aquatic animals such as fish, shrimp, and/or plankton in intensive fish-raising facilities as a function of the individual species of fish, whereby even different species of aquatic animals can find their individually optimal specific conditions in one facility, since, by using a bubble curtain with variable intensity, by which an activated sludge composed of fish excrement, food residue, and a microorganisms can be kept suspended, the optimum biological boundary conditions can be utilized for one or more animal species, in order to achieve maximum growth rate at minimum cost, especially with limited space requirements.

One advantageous improvement on the invention is characterized by the activated sludge composed of fish excrement and food residue being vorticized in a weakly turbulent fashion primarily by the gas containing oxygen, released by the gasification equipment located on the bottom of the fish pond, and being kept suspended and distributed in the fish part by an optional additional horizontal flow component.

The solution according to the invention is based on discoveries made in connection with the method of fish raising in aerated pools. According to this, especially at night when biological contribution of oxygen by algae is missing, the pool water is ventilated and circulated in different ways, but care is taken not to constantly stir up the sludge settling out on the bottom of the pool and not to keep it suspended in the pool water because this would have disadvantageous effects on the fish. On the other hand, the gasification equipment creates relatively strong turbulence in the water which also has a disadvantageous effect on the fish.

Surprisingly, it has now been found that activated sludge, even when mixed with algae, will have practically no negative effect on a number of fish and other aquatic animal species if it is kept suspended forcibly and constantly in water with a sufficient oxygen content and low turbulence.

Although it has occasionally been observed that in fishraising facilities with activated sludge bypass arrangements, fish would get into the activated sludge part and survive there, it had previously been assumed that optimum fish growth was impossible under these conditions. Deliberately raising fish or other edible aquatic animals, in water containing activated sludge with the addition of food, is not known. In addition, it is not known how water containing activated sludge should be stirred up so that it exhibits optimum conditions for the fish and the activated sludge.

One advantageous improvement of the invention is characterized by the throughput volume of gas containing oxygen and/or the gas pressure being varied by means of a control device and kept so low that fish will not be adversely affected by the resultant turbulence. This is generally ensured in the case of larger fish if, with bubble sizes less than 4 mm in diameter, less than 10 cubic meters of gas are blown in per square meter of aerator surface per hour. In the case of smaller fish, the aeration intensity must be corresponding less.

One advantageous embodiment of the invention is characterized by the pond bottom being sloped and an aerating device being located at the deepest point, or by the pond bottom consisting of several sloped bottom areas at each of whose lowest points aerating devices are located.

Alternatively to this arrangement, at least one aerating device can be located above the deepest point of the pond and a removal device can be provided in the vicinity of the deepest point of the pond.

Another advantageous improvement of the invention is characterized by the pond bottom being V-shaped or consisting of several V-shaped bottoms arranged side by side, with vertical shafts being provided above the aerating devices, said shafts possibly being provided with packings. In addition, screens can be placed above the aerating devices.

In another advantageous embodiment, the pond bottom is made trapezoidal and at least one aerating device is disposed in the horizontal part of the trapezoidal bottom, and a vertical shaft and/or at least one packing is optionally located above the aerating device or devices.

One advantageous improvement of the invention is characterized by the pond bottom being designed to be pyramidal or W-shaped, or by the fish pond being designed as a round pond with a conical bottom.

BRIEF DESCRIPTION OF THE DRAWINGS

Advantageous improvements of the invention are characterized in the subclaims or will be described in greater detail below together with the description of the preferred embodiment of the invention, with reference to the figures.

DESCRIPTION OF A PRESENTLY PREFERRED EMBODIMENT

The method according to the invention and the devices for working the method have the following essential features:

1. Aerating devices in the vicinity of the V-shaped, W-shaped, trapezoidal or conical deepest points in a pool or fish pond,
2. Weak pressurization of the aerating devices so that the resultant upward movement of the mixture of water and air bubbles is not too great and does not carry fish or other aquatic animals with it,
3. Walls and/or bottom sloping down to the lowest point so that settling sludge flows away and is then transported upward again by the gas bubbles,
4. Integration of a settling system or a screen so that practically sludge-free water flows out of the fish part depending on the amount of water added, and
5. Addition of an amount of water so small that, as a result, such a large quantity of sludge is produced through feeding that a certain ratio is obtained between the substances that will settle (sludge) and the food.

EXAMPLE 1

From 1 kg of dry food fed to the fish, the fish excrement produces about 5 l of settled activated sludge (with a dry substance content of 1-2%). With the addition of 50 l of water per kg of food, therefore, 5 l of activated sludge are produced in 50 l; in other words, 100 ml of activated sludge per liter.

At 1 kg of food per day, approximately 50 l of activated sludge are required for biological decomposition of fish excrement, so that at 100 ml of activated sludge per liter, 500 l of water containing activated sludge will be required. This volume is simultaneously sufficient to contain the fish that eat the kilogram of food. It has been found that for every 500 l of pond volume, 1 kg of food can be fed per day; the excrement is readily decomposed by the 50 l of activated sludge contained therein, and the amount of water that needs to be added is 50 l of clean water, while 50 l of sludge water containing 5 l of activated sludge (from 1 kg of food) flow out.

Under these circumstances, therefore, no settling pond is required and the system in this example is said to be in flow equilibrium. For the oxygen supply, in the case of a pond 2.5 m deep, having a surface area of 0.2 $m^2$, 1 to 2 cubic meters of air must be added each hour in the form of fine bubbles. If the entire bottom of the fish pond is provided with aerating devices, only slight turbulence is produced in the water.

EXAMPLE 2

In the case of salmon and trout, which require clear water containing less than 3 ml of settled activated sludge per l, since they must use their eyes to find the food, once again 50 l of activated sludge is required per kg of food, in other words with 3 ml of activated sludge per l, a total of 17 cubic meters of water are required for each kg of food given.

Since 5 l of activated sludge are also produced per kg of food, in order to achieve flow equilibrium, 1.7 $m^3$ of clean water per kg of food must be added and 1.7 $m^3$ of water containing sludge must be removed.

The later can be directed into a settling pond, the sludge removed, and the clear water recycled into the fish pond so that water is saved.

Approximately 50 kg of salmon are required per kg of food, said salmon being in the above fish pond with a capacity of 17 cubic meters, in other words 3 kg of salmon per cubic meter.

The surface area of a salmon pond of this kind is about 5 $m^2$ when the depth is 2.5 m, so that only a portion of the bottom need be fitted with aerators to add sufficient oxygen using fine bubble aeration.

EXAMPLE 3

This equipment is relatively limited for an intensive fishraising facility: 30 kg per cubic meter is possible for salmon. Therefore, the fish part can be reduced by screens and the water volume in the pond retained. Or packing can be installed above the aerators, which adhesively binds the activated sludge and increases the decomposition efficiency per unit area without activated sludge flakes having to be kept suspended.

If it is desired to keep 30 kg of salmon per cubic meter of fish part, and it is desired to feed 0.7 kg of food, approximately 0.2 cubic meters of packing with about 35 square meters of surface area per 30 kg of salmon (0.7 kg of food) would have to be installed. With an additional requirement for the aerators (approximately 0.2 m$^3$ of space per 30 kg of salmon), the result would be a fish part of $1+0.2+0.2=1.4$ m$^3$. If we use a figure of 1.7 m$^3$ of water per kg of food, as in Example 2, the 3 ml of activated sludge per liter would be obtained as the flow equilibrium. This is recycled into the settling pond 0.04 m$^2$ area for each 30 kg of salmon, approximately 0.1 m$^3$ of the settling tank), the clear water is recycled, and the sludge is removed.

It is important in this connection that the packing be beneath the fish and, like the fish part, be subjected to a water flow which is only slightly turbulent, with the packing being closed off at the top by screens which allow the water and air bubbles to pass through but do not allow the food or fish to go down. Therefore the bottom part of the fish part must be sloped without aerators or packing so that no sludge can settle there.

Figure 1:
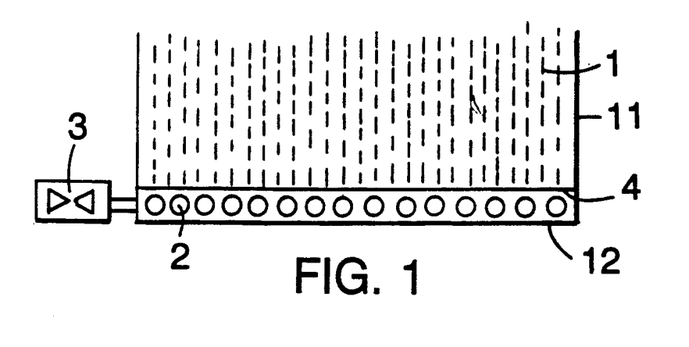
FIG. 1 is a cross section through a pond with gasification and/or aerating devices distributed over the pond bottom.

FIG. 1 shows a cross section through a fish pond 1 with optionally vertical or sloping side walls 11 and a bottom 12 which is completely fitted with an aerating device 2 fed by an assembly 3 with gas containing oxygen, whose volume per unit time or whose pressure is adjustable or can be regulated at assembly 3.

Aerating device 2 can consist of aerating tubes, plates, hoses, or of rubber-elastic, hose-shaped membranes whose walls have perforations through which the gas supplied passes from the inside to the outside and enters the surrounding liquid in the form of bubbles.

The gas pressure is adjusted at assembly 3 or regulated by the latter in such fashion that a bubble curtain that is as uniform as possible is produced throughout fish pond 1, said curtain containing no major turbulence. Many species of fish such as salmon or trout which must find their food using their eyes do surprisingly well in this uniform bubble curtain. As an alternative, in the so-called activated sludge method the settling sludge is kept vorticized by the uniform bubble pattern and kept suspended, which is contrary to the lifestyle of many species of fish such as sheatfish, eels, carp, tench, plaice, turbot, and the like.

Depending on the gas throughput, the design of the pond bottom, and depending upon additional measures such as the addition of a settling pond, algae pool or the like, measures can be used which are adjusted to one another and permit optimum raising of other aquatic animals as well.

A screen 4 can be provided above aerating device 2, and additional packings can be located between aerating device 2 and screen 4, so that the packings are beneath the fish and have only a weak flow of water through them. As a result, the packings are closed at the top by screens which allow water and air bubbles to pass upward but do not allow food or fish to pass downward.

Figure 2:
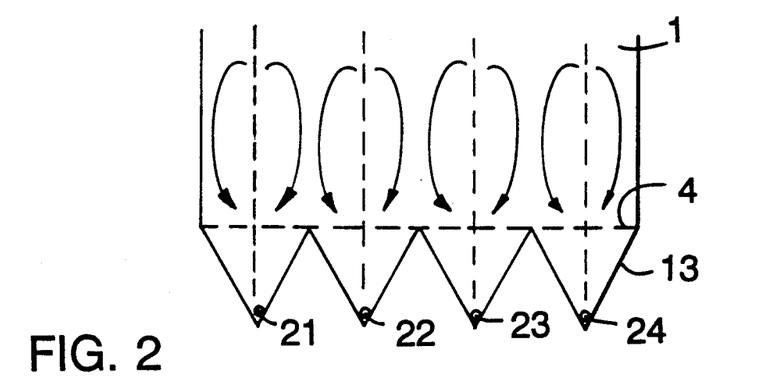
FIG. 2 is a cross section through a pond bottom with sloping walls provided only partially with aerating devices.

A cross section in FIG. 2 shows a fish part bottom provided only partially with aerating devices 21 to 24, while the remainder of the bottom 13 is sloped in a V-shape. Aerating devices 21 to 24 are located at the lowest point in fish part bottom 13, so that no sludge can settle on the bottom but is vorticized instead by the gas escaping from the aerating device and is kept suspended in the fish part. In this embodiment as well, the bottom of the fish part can be formed by a screen 4 allowing gas and water to pass through but retaining the fish and activated sludge.

Figure 3:
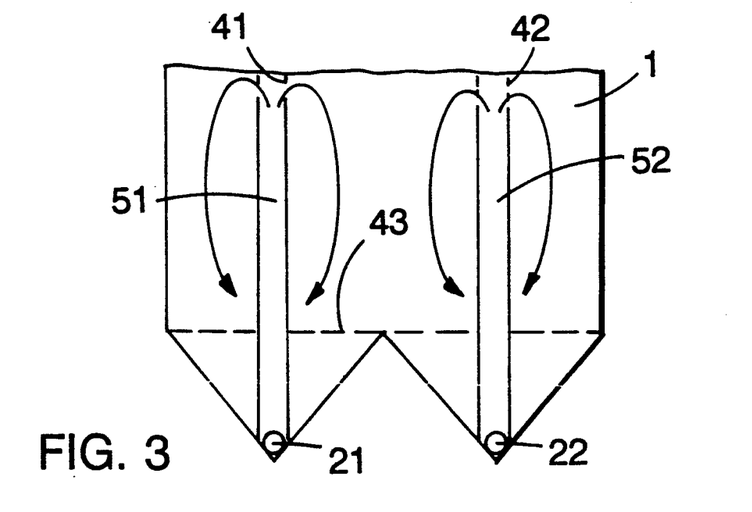
FIG. 3 is a cross section through a pond according to FIG. 2 with shafts above the aerating devices.

FIG. 3 shows additional vertical shafts 51 and 52 located above aerating devices 21, 22, said shafts being sealed off at their upper edges abutting the water surface by screens 41 and 42. In addition a screen 43 is mounted horizontally above the V-shaped bottom. Fish can be kept both inside and outside the shaft.

Figure 4:
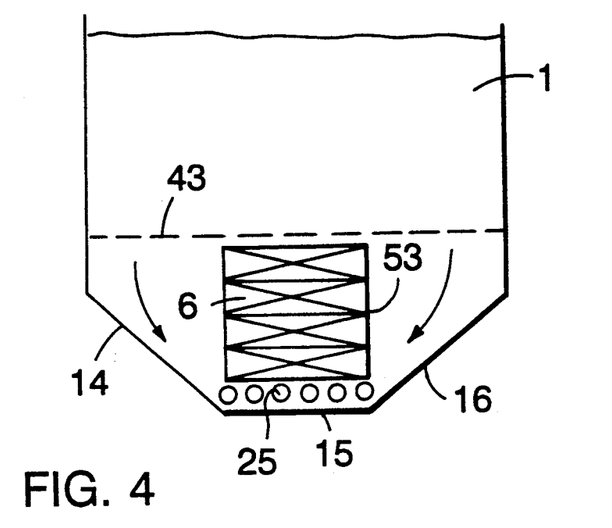
FIG. 4 is a cross section through a pond according to FIG. 3 with packings in the shafts.

FIG. 4 shows a cross section through a fish pond 1 with a trapezoidal bottom 14, 15, 16 on whose horizontal bottom part 15 aerating devices 25 are disposed, above which a vertical shaft 53 with packings 6 located therein is provided.

Figure 5:
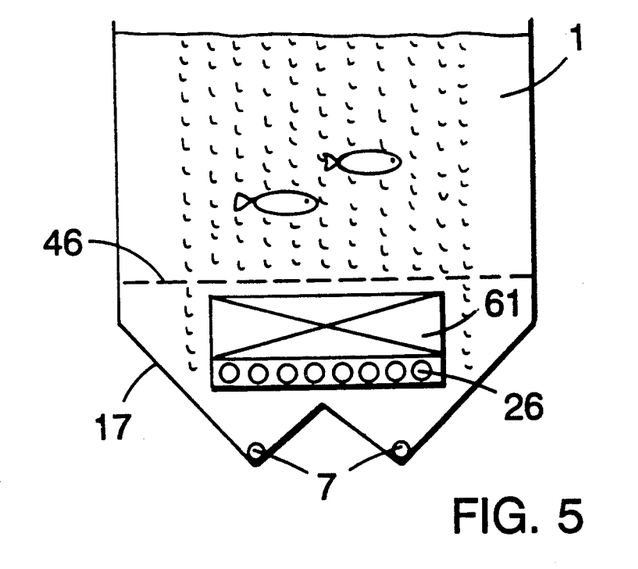
FIG. 5 is a cross section through a pond with a V-shaped nonaerated deep part below the aerating devices.

FIG. 5 shows a cross section through a fish pond 1 with a W-shaped bottom 17 whose deep part, in contrast to the embodiments described above, is not aerated. Instead, aerating device 26 is located above the deep part and has packings 61 located above it, said packings being sealed off from the fish part by a screen 46.

Removal devices 7 slide along the lowest point in pond bottom 17 and carry away the settling activated sludge to a removal or vorticizing location where it is either removed or vorticized into the fish part of the fish pond. The bottom of the fish part is formed by a screen 46 so that fish cannot get into the deep part of the fish pond or the packing. The deep part thus fulfills the function of a settling pond. Only about 5 l of dried sludge per kg of food beneath the fish has to be removed with removal device 7, so that larger removal devices are not required. Settling of sludge in the deep part is considerably aided by the weak, turbulent flow in the fish part.

Figure 6:
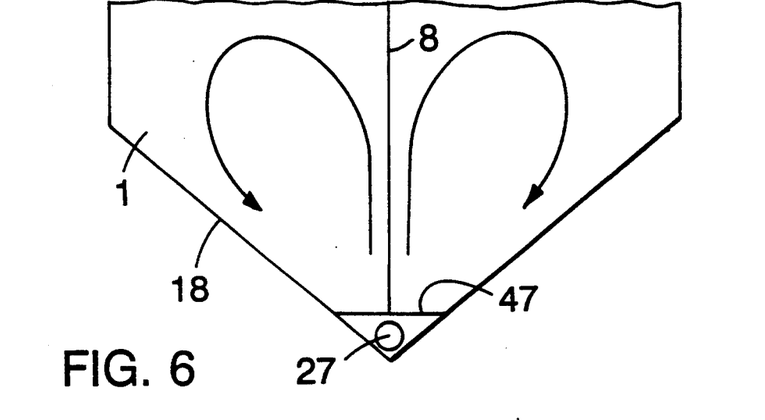
FIG. 6 is a cross section through a plankton pool or fish pond with a vertical wall located above an aerating device.

FIG. 6 shows a cross section through a pond 1 with V-shaped side walls 18 extending down to the bottom of the pond, where an aerating device 27 with screen 47 optionally disposed above it is located. A vertical wall 8 extending above the surface of the water is located above screen 47 or aerating device 27.

As a result of this arrangement, the flow pattern shown in FIG. 6 is obtained from the bubble curtain rising in the pond. This solution is suitable for example for raising plankton, whereby different species and quantities of plankton can be found in the two halves of the pond. This arrangement is especially suitable for raising algae on one side and zooplankton to eat the algae, on the other side.

Figure 7:
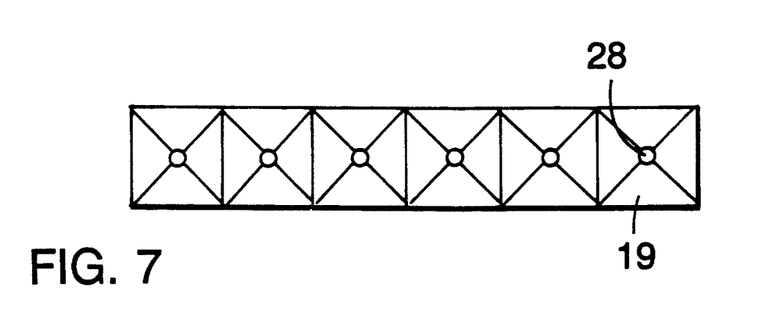
FIG. 7 is a top view of a pond with a pyramidal bottom.
Figure 8:
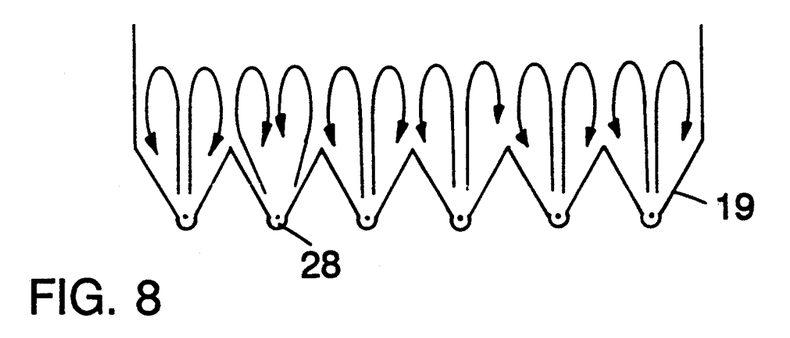
FIG. 8 is a cross section through a pond with a pyramidal bottom according to FIG. 7.

FIG. 7 is a top view and FIG. 8 a cross section through a pond with a plurality of pyramidal bottoms 19, arranged side by side, and having at the deepest point a connection for an aerating device 28.

Figure 9:
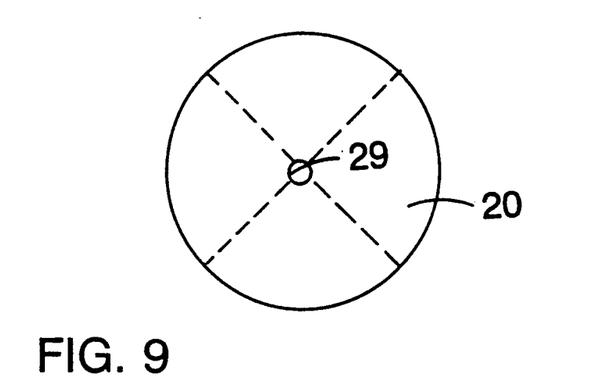
FIG. 9 is a top view of a pond with a conical bottom.
Figure 10:
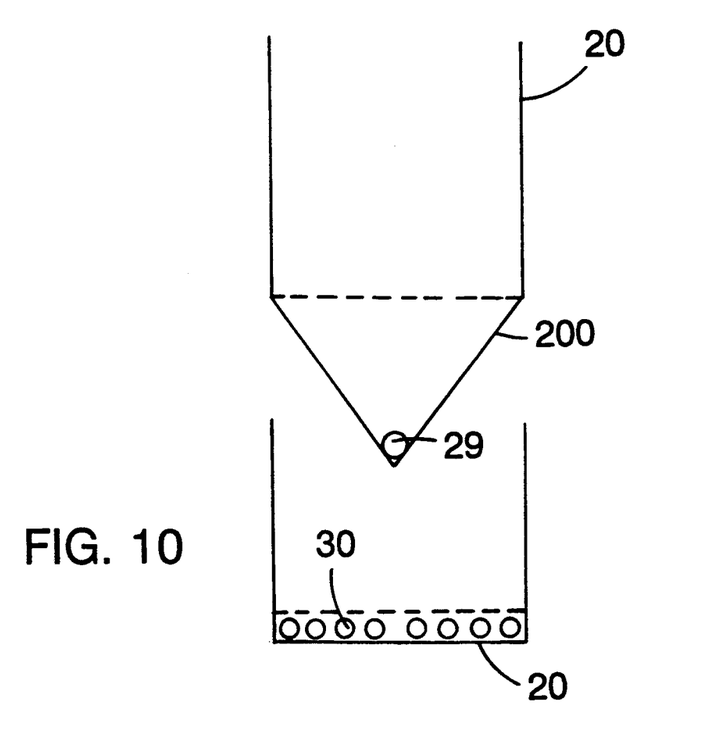
FIG. 10 is a cross section through a pond with a conical bottom according to FIG. 9.

FIGS. 9 and 10 show in top view and cross section a round pond 20 made cylindrical down to the bottom; in this case, the bottom is covered over its entire surface with aerating devices 30, while a V-shaped bottom 200 requires only one aerating device 29.

In an embodiment not shown in greater detail in the drawing, the pools or ponds can be made in the form of trenches which are V-shaped in cross section, a few meters wide, and 100 meters long for example. The fish are pushed along the trenches from one end to the other by vertical screens set crossways.

Consequently, the aerating device is supplied with only a small amount of gas containing oxygen, so that with a gas volume of less than 10 cubic meters, preferably less than 6 cubic meters per square meter of aerator surface is used, since otherwise the water flows upward too rapidly.

In addition to raising fish, raising plankton as food for fish plays an important role in aquaculture. By using the device according to the invention, alternatively to or in addition to fish raising, plankton can be raised in the ponds described above, with the aerating devices being usable to supply, besides gas containing oxygen, pure oxygen, air, or gas containing carbon dioxide to feed the algae.

Figure 11:
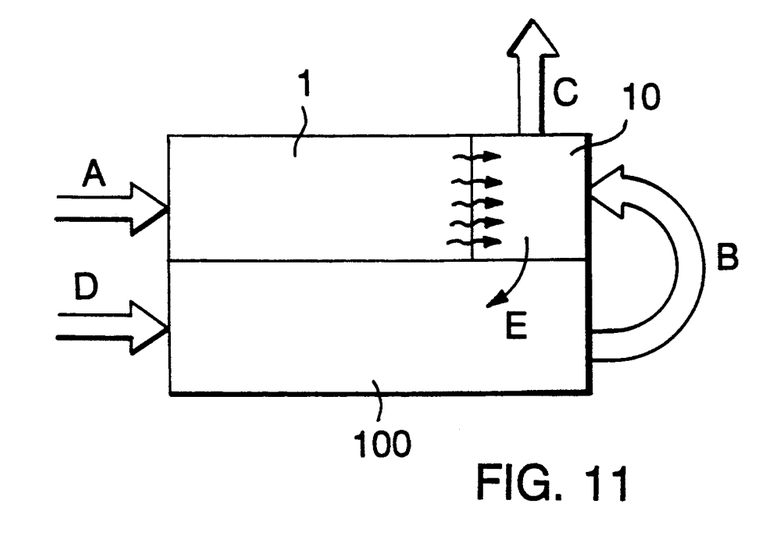
FIG. 11 is a schematic top view of a fish pond associated with settling and algae ponds.

FIG. 11 is a schematic top view of an intensive fish-raising pond 1 with algae pond 100 located beside it and a settling pond 10 associated with fish pond 1.

The water containing activated sludge that drains out of fish pond 1 is an outstanding nutrient medium for daphnia; a daphnia pond can be provided instead of settling pond 10, and the daphnia fed to the fish being raised. The clear wastewater, like the water containing sludge, is an outstanding nutrient medium for algae so that algae can be raised in a pond 100 and then be eaten by the daphnia in pond 10.

Since algae are very small and do not settle, they can be removed by simultaneously running the water containing the algae and the water containing the activated sludge through a settling pond 10 using activated sludge as a highly efficient "suspension filter". The mixture can then be thickened further and processed as fish food (activated sludge makes good fish food as well), or fed to daphnia or "filtering" animals such as shrimp or the like.

The current annual production in central Europe is a maximum of 6 tons of fish per hectare. The method according to the invention allows production of 120 tons of fish per hectare in a pool without a roof and 360 tons per hectare in a pool with a roof. With a combination including an additional hectare of algae pool, 1,000 tons of fish can be produced on a total of two hectares (one hectare of fish and one hectare of algae). Water consumption is then minimal.

In the arrangement shown in FIG. 11, fresh water A is supplied to the fish pond and clear water E is supplied from the settling pond to algae pond 100. The latter can also be fertilized with liquid manure, chicken droppings, molasses, or other materials containing fertilizer. Algae and activated sludge are recycled into settling pond 10 and sludge and algae are drawn from the latter for use as food or for raising daphnia, which in turn are fed along with the algae and the activated sludge to fish, whose excrement is used to provide part of the food supply for the algae.

In this nearly closed cycle, solar radiation is the only limiting factor. Since algae consume oxygen at night, stronger aeration must be provided at night by the method according to the invention, in other words oxygen must be supplied: it is therefore optimal to feed the fish only in the day and thus take advantage of the oxygen produced by the algae, and at night to add much less oxygen for the resting metabolism of the fish, activated sludge, and algae. During the day, circulation is performed with only a small amount of gas added because at that time sufficient oxygen is given off by the algae.

In a variation on this, the fish pond can be housed in a building to increase intensive fish raising and a plurality of packings can be provided beneath the fish parts. The fish pond is connected by a drain to an algae pool and the algae pool is advantageously supplied only during the daytime. A bypass is provided between the algae pool and an additional daphnia pond so that the daphnia pond is continuously supplied from the algae pool. Enriched daphnia are recycled into the fish part with a small amount of water which is clean.

Since this results in a small amount of water being exchanged in the fish part, the drainage from the fish pond, which contains sludge, can be exchanged in a countercurrent heat exchanger for pool (daphnia) water at a different temperature, thus keeping the temperature optimal for the fish. In winter in Europe for example, a fish pond temperature of 25 C. is desirable, with an algae pool temperature (under a roof) of 10 C. since many algae grow well under these conditions.

In hot countries, the algae pool could simultaneously serve as a cooling device for the heat that accumulates in the fish part.

In the algae pools it is possible to have a mixed culture of algae and activated sludge, with algae settling on the surfaces of the activated sludge which can be then enriched by placing it in a pond 10, considerably simplifying the otherwise highly problematical algae production process.

The depth of the algae pool with vertical circulation is preferably at least two meters. Surprisingly, it has been found that with the vertical circulation of the algae water according to the invention, surface production of algae is even higher than with the usual horizontally circulated flat algae ditches. In addition, the volume of the pool must be large so that the required large quantities of sludge can be provided for breaking down the fish excrement. Therefore, the aerating devices are preferably located at a depth of 2.5 meters, optimally 3 to 5 meters.

The large body of water also ensures a smaller difference between day and night water temperature, so that the major disadvantages of shallow algae pools are avoided.

When fish pools are overfed with fish food, it is possible at night to have such a high oxygen consumption and sometimes excretion of algae toxins, that the fish are endangered. It was previously a problem to aerate and circulate pools at night with a small amount of energy to avoid endangering the fish. Therefore algae in such pools are often killed with chlorinated lime, which also kills part of the bottom fauna. In the new method, the large quantity of algae which necessarily results from such a high level of fertilization poses no problem because the anoxic conditions which are otherwise so dangerous are reliably prevented.

The algae pools consist of individual long ditches a few meters wide, with a bottom that slopes at least 30° and preferably more than 45°. The ditches are advantageously made twice as wide as they are deep at the deepest point, with aerators mounted in the center, and can be traversed as quickly or slowly as desired with vertical circulation induced by the aeration, with the water moving in the horizontal direction. This horizontal flow is produced for example by providing an overflow between two preferably parallel trenches, at the ends of said trenches, with the fish being held back by screens. The water is pumped from one trench into the other, for example by using an airlift pump.

Fertilizer can be added at one point and distributed over the surface by horizontal flow. However, the vertical recycling means that the latter need not be as great as in known algae pool systems, which must have a horizontal flow of more than 20 cm per second for example, using paddles to keep the algae from settling.

In fish ponds as well, a horizontal flow is deliberately generated to ensure uniform horizontal sludge distribution. Optimally two or more trenches are connected together to form a horizontal circuit.

Figure 12:
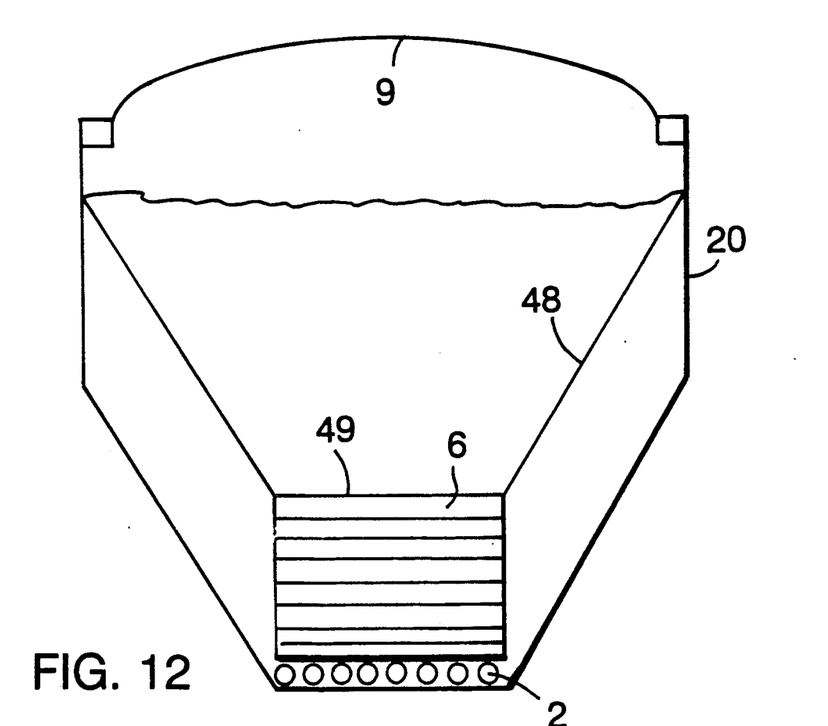
FIG. 12 is a cross section through a fish pond with a trapezoidal bottom and sloping screens.

The construction of heat insulating roofs above the pools is considerably simplified by providing narrow parallel ditches, with small vertical partitions 20 between them (see FIG. 12). Carriages 9 can be mounted on partitions 20, for example extending across the trenches, upon which automatic feeders for fish food can be mounted.

Optimally, when using packings 6, the entire pond bottom should not be equipped with aerators and packing, but nonaerated zones should be left between them. Consequently, a sloping bottom must be provided in these nonaerated zones so that the settling sludge flows toward the aerator. It is advantageous for the fish part to have sloping screens 48 above the nonaerated zones, with slower flow rates for the water in these screens 48.

FIG. 12 shows a cross section through a device of this kind with sloping screens 48 and a carriage 9 mounted above a fish pond ditch.

The description above presents the following measures for optimizing the raising of aquatic animals and algae:

1. An extensive arrangement of aerating devices on the bottom of a pond or partial provision of aerating devices on the bottom of a pond, with the bottom tilted toward the aerating device and the aerating device located at the deepest point.

As a result, the bottom is either flat or V- or multiple V-shaped, pyramidal, or conical, with aerating devices located at the deepest point.

2. Provision of the aerating devices with a gas containing oxygen in such a manner that a bubble curtain is produced in the pond, with the pressure of the gas supplied being controllable and regulatable.

3. For certain species of fish, additional maintenance of activated sludge in suspension, with at least 20 l of settled sludge per kg of daily food volume, optionally even more than 40 l of sludge per kg of daily food volume, should be present; this can be determined by filtering or using a so-called Imhoff funnel after 1 to 2 hours settling time.

4. If packings are used above the aerating devices, the freefloating activated sludge volume (required for salmon, etc.) can be less, for each square meter of packing area, about 20 g of food can be fed additionally per day.

5. A settling or filter facility can be connected to the fish part to hold back the sludge in the fish pond, which is good for eels, sheatfish, plaice, carp, tench, turbot, and the like. Thus the quantity of sludge can be made greater, since practically no sludge is lost with the water that escapes. Overenrichment of the sludge can then be avoided by deliberately withdrawing sludge through an additional drain, monitoring the amount thus drawn off.

6. Both clear water and deliberately drawn-off sludge can be used in the bypass:
   a) To thicken the sludge and to be used in making food,
   b) To be used in daphnia ponds,
   c) To be used in algae pools,
   d) To be used in daphnia ponds and algae pools.

The invention is not limited in its implementation to the preferred embodiments described above. Rather, a number of variations are possible which make use of the solution described even in considerably altered embodiments.

I claim:

1. A device for raising aquatic animals comprises a breeding pond divided at least partially with gasification devices which generate a large-area gas bubble curtain, said breeding pond being connected to a supply of fresh water and connected with a sludge settling pond in which, under control, an adjustable quantity of sludge is drawn off from said breeding pond and which is connected with an algae-pool into which purified water is introduced under control from said sludge settling pond.

2. The device for according to claim 1 wherein said sludge settling pond is connected with a zooplankton pond into which purified water is introduced under control from said sludge settling pond.

3. The device for according to claim 1 wherein said sludge settling pond is connected with a zooplankton pond into which sludge is introduced under control from said sludge settling pond.

4. The device for according to claim 1 wherein said sludge is introduced into said algae-pool under control from said sludge settling pond.

5. The device for according to claim 1 wherein said sludge is introduced into said algae-pool under control from said breeding bond.

6. A device for raising aquatic animals comprising a breeding pond provided at least partially with gasification devices which generate a large-area gas bubble curtain, said breeding bond being connected to a supply of fresh water and connected with a sludge settling pond in which, under control, an adjustable quantity of sludge is recycles into said breeding pond and which is connected with an algae-pool into which purified water is introduced under control from said sludge settling pond.

7. The device according to claim 6 wherein said sludge settling pond is connected with a zooplankton pond into which purified water is introduced under control from said sludge settling pond.

8. The device according to claim 6 wherein said sludge settling pond is connected with a zooplankton pond into which sludge is introduced under control from said sludge settling pond.

9. The device according to claim 6 wherein said sludge is introduced into said algae-pool under control from said sludge settling pond.

10. The device according to claim 6 wherein said sludge is introduced into said algae-pool under control from said breeding pond.

11. A device for raising aquatic animals comprising a breeding pond provided at least partially with gasification devices which generate a large-area gas bubble curtain, said breeding pond being connected to a supply of fresh water and connected with a sludge settling pond in which, under control, an adjustable quantity of sludge is drawn off from said breeding pond and which is connected with a zooplankton pond into which purified water is introduced under control from said sludge settling pond.

12. The device according to claim 11 wherein said sludge is introduced into said zooplankton pond under control from said sludge settling pond.

13. The device according to claim 11 wherein said sludge is introduced into said zooplankton pond under control from said breeding pond.

14. The device according to claim 11 wherein said sludge settling pond is connected with an algae-pool into which purified water is introduced under control from said sludge settling pond.

15. A device for raising aquatic animals comprising a breeding pond provided at least partially with gasification devices which generate a large-area gas bubble curtain, said breeding pond being connected to a supply of fresh water and connected with a sludge settling pond in which, under control, an adjustable quantity of sludge is recycled into said breeding pond and which is connected with a zooplankton pond into which purified water is introduced under control from said sludge settling pond.

16. The device according to claim 15 wherein said sludge is introduced into said zooplankton pond under control from said sludge settling pond.

17. The device according to claim 15 wherein said sludge is introduced into said zooplankton pond under control from said breeding pond.

18. The device according to claim 15 wherein said sludge settling pond is connected with an algae-pool into which purified water is introduced under control from said sludge settling pond.

19. The device according to any one of the foregoing claims 15, 20, 25 or 29, wherein said breeding pond comprises a bottom or walls that are at least partially sloped and a deepest point, said gasification devices are disposed at said deepest point of said breeding pond, and a removal device is provided in the vicinity of said deepest point of said breeding pond.

20. The device according to any one of the foregoing claims 1, 6, 11 or 15, wherein said breeding pond comprises a bottom or walls that are at least partially sloped and a deepest point, said gasification devices are disposed above said deepest point of said breeding pond, and a removal device is provided in the vicinity of said deepest point of said breeding pond.

21. The device according to any one of the foregoing claims 1, 6, 11 or 15, wherein vertical shafts provided with packings are located above said gasification devices.

22. The device according to any one of the foregoing claims 1, 6, 11 or 15, wherein screens are disposed above said gasification devices.

23. The device according to any one of the foregoing claims 1, 6, 11 or 15, wherein said breeding pond has a trapezoidal bottom, at least one gasification device is disposed in the horizontal part of said trapezoidal bottom, and a vertical shaft is disposed above said gasification device.

24. The device according to claim 23 wherein at least one packing is disposed above said gasification device.

25. The device according to any one of the foregoing claims 1, 6, 11 or 15, wherein said breeding pond has a trapezoidal bottom, at least one gasification device is disposed in a horizontal part of said trapezoidal bottom, and at least one packing is disposed above said gasification device.

26. The device according to any one of the foregoing claims 1, 6, 11 or 15, wherein said breeding bond has a pyramidal bottom.

27. The device according to any one of the foregoing claims 1, 6, 11 or 15, wherein said breeding pond has a W-shaped bottom.

28. The device according to any one of the foregoing claims 1, 6, 11 or 15, wherein said breeding pond has the form of a round pond with a conical bottom.

29. The device according to any one of the foregoing claims 1, 6, 11 or 15, wherein said breeding pond has the form of a round pond with a flat bottom.

30. The device according to any one of the foregoing claims 1, 6, 11 or 15, wherein said breeding pond has a bottom with the form of a trench with a V-shaped cross section.

* * * * *

UNITED STATES PATENT AND TRADEMARK OFFICE
CERTIFICATE OF CORRECTION

PATENT NO. : 5,158,037
DATED : October 27, 1992
INVENTOR(S) : Wilke Engelbart

It is certified that error appears in the above-indentified patent and that said Letters Patent is hereby corrected as shown below:

Col. 11, line 25; "15, 20, 25 or 29" should be --1, 6, 11, 15--.

Signed and Sealed this

Twenty-first Day of December, 1993

Attest:

BRUCE LEHMAN

Attesting Officer      Commissioner of Patents and Trademarks